United States Patent [19]

Shell

[11] Patent Number: 5,209,173
[45] Date of Patent: May 11, 1993

[54] ELONGATE FITTING WITH AN EYE AND A "V"-CHANNEL FOR COMPRESSIVELY ENGAGING A ROPE, PARTICULARLY FOR CARGO TIE-DOWN

[76] Inventor: David A. Shell, 500 Rancheros Dr. #110, San Marcos, Calif. 92069

[21] Appl. No.: 818,057

[22] Filed: Jan. 8, 1992

Related U.S. Application Data

[63] Continuation-in-part of Ser. No. 686,050, Apr. 16, 1991, abandoned.

[51] Int. Cl.⁵ ............................................. F16G 11/10
[52] U.S. Cl. .................................. 114/218; 24/129 R
[58] Field of Search ................ 114/218, 381; D8/356; 24/129 A, 129 K, 130, 136 K, 115 K, 265 CD

[56] References Cited

U.S. PATENT DOCUMENTS

4,630,982  12/1986  Fenner ........................... 24/265 CD
4,910,834   3/1990  Minkler ............................ 24/129 R

*Primary Examiner*—Joseph F. Peters, Jr.
*Assistant Examiner*—Clifford T. Bartz
*Attorney, Agent, or Firm*—Frank D. Gilliam

[57] ABSTRACT

A generally elongate fitting has a distal-end region for affixing an external object, a mid-region eye, and a proximal-end region for attaching a rope. In one embodiment, the distal-end and middle regions are configured as an eye hook having an eye at its proximal end, a hook at its distal end, and a connecting shank between the hook and the eye. In another embodiment, the distal-end region is configured as a base member bolt-mounted to the external object, a rotating member rotatably mounted to the base member, and an arm pivotally mounted to the rotating member, forming thereby a swivel joint. In this embodiment the mid-region's eye is integrally within the arm. In both embodiments the distal- and mid-regions are formed integrally with a proximal-end region defining one or more "V" channels. In one embodiment "V" channels are formed as a modified cleat having both (i) a pair of projecting arms and (ii) one or more additional projecting arms. Both channels are suitable to compressively engage a rope that is forcibly wedged within such channel. A rope slipped through the eye is pulled taught against the eye, and not against either channel, until, a desired tension in the rope having been achieved, the rope is easily, while still held taut, angled into that channel of the cleat which is formed between the two projecting arms. The rope is then pulled tight into the remaining channel, and rethreaded through the eye in an opposite direction.

13 Claims, 3 Drawing Sheets

| TEST NO. | FAIL LOAD | MATERIAL | COMMENTS |
|---|---|---|---|
| 1 | 400 LB | 8-18 14% GLASS FILLED NYLON | LOOPED NOT PACKED & VENTED WELL |
| 2 | 360 LB | 8-18 14% GLASS FILLED NYLON | CINCHED NOT PACKED & VENTED WELL |
| 3 | 320 LB | 8-18 14% GLASS FILLED NYLON | CINCHED NOT PACKED & VENTED WELL |
| 4 | 380 LB | 8-18 14% GLASS FILLED NYLON | LOOPED NOT PACKED & VENTED WELL |
| 5 | 320 LB | 8-18 14% GLASS FILLED NYLON | CINCHED VENTED & PACKED WELL |
| 6 | 360 LB | 8-18 14% GLASS FILLED NYLON | CINCHED VENTED & PACKED WELL |
| 7 | 400 LB | 8-18 14% GLASS FILLED NYLON | LOOPED VENTED & PACKED WELL |
| 8 | 420 LB | 8-18 14% GLASS FILLED NYLON | LOOPED VENTED & PACKED WELL |
| 9 | 260 LB | ABS 30% GLASS FILLED | CINCHED REINFORCED FORK AREA |
| 10 | 220 LB | ABS 30% GLASS FILLED | LOOPED REINFORCED FORK AREA |
| 11 | 240 LB | ABS 30% GLASS FILLED | LOOPED REINFORCED FORK AREA |
| 12 | 200 LB | ABS 30% GLASS FILLED | CINCHED REINFORCED FORK AREA |
| 13 | 320 LB | POLYCARBONATE | CINCHED DEFORMED SLIPPED OFF HOOK |
| 14 | 400 LB | POLYCARBONATE | LOOPED DEFORMED SLIPPED OFF HOOK |
| 15 | 280 LB | POLYCARBONATE | LOOPED DEFORMED SLIPPED OFF HOOK |
| 16 | 340 LB | POLYCARBONATE | CINCHED DEFORMED SLIPPED OFF HOOK |
| 17 | 560 LB | 6 NYLON 30% GLASS FILLED | LOOPED NARROW FORK AREA (ONLY THESE ARE NARROW) |
| 18 | 240 LB | 6 NYLON 30% GLASS FILLED | CINCHED NARROW FORK AREA (ONLY THESE ARE NARROW) |
| 19 | 520 LB | 6 NYLON 30% GLASS FILLED | LOOPED NARROW FORK AREA (ONLY THESE ARE NARROW) |
| 20 | 260 LB | 6 NYLON 30% GLASS FILLED | CINCHED NARROW FORK AREA (ONLY THESE ARE NARROW) |
| 21 | 280 LB | 6 NYLON | LOOPED REINFORCED FORK AREA |
| 22 | 400 LB | 6 NYLON | CINCHED REINFORCED FORK AREA |
| 23 | 280 LB | 6 NYLON | LOOPED REINFORCED FORK AREA |
| 24 | 280 LB | 6 NYLON | CINCHED REINFORCED FORK AREA |

FIGURE 4

ELONGATE FITTING WITH AN EYE AND A "V"-CHANNEL FOR COMPRESSIVELY ENGAGING A ROPE, PARTICULARLY FOR CARGO TIE-DOWN

REFERENCE TO RELATED PATENT APPLICATIONS

The present application is a continuation-in-part of U.S. patent application Ser. No. 07/686,050 filed Apr. 16, 1991, now abandoned for a COMBINATION EYE HOOK AND MODIFIED CLEAT, PARTICULARLY FOR CARGO TIE-DOWN.

BACKGROUND OF THE INVENTION

1. Field of the Invention

The present invention generally concerns a fitting for the fastening or lashing of ropes in order to secure cargo or freight or the like in or on trucks, aircraft, ships, railroad cars, or other vehicles and vessels. The present invention particularly concerns an elongate fitting made from metal or strong synthetic material, and having features that are used synergistically so as to permit the effective (i) tightening, and (ii) securing, of ropes by hand.

2. Background of the Invention

Numerous devices and methods are known for fastening or securing ropes, lines, chains, or other flexible linear members in order to secure cargo and freight to the beds, floors, or decks of vehicles, ships, and aircraft. These devices and methods are of varying effectiveness in (i) weight, (ii) speed of attachment, (iii) ease of attachment, (iv) tightness, or force, of attachment, (v) security of attachment, and against loosening, including attachment security during changes in spatial position and/or applied forces, (vi) strength, and/or (vii) cost. Often devices or methods that excel in one area prove mediocre, or deficient, in other areas.

A classic fitting for the securing of ropes or lines is a cleat, such as is typically abundantly used in the upperworks of the rigging of a sailboat. A cleat is strongly permanently attached to a surface such as a deck: a cleat is not used suspended in space such as by any attachment to ropes or lines. A cleat typically has a base which is mounted to a surface, a central support member extending perpendicularly from a central region of the base, and an elongate supported member extending from central support member in a plane parallel to the plane of the base and also to the surface to which the base is mounted. Normally the base, the support member and the supported member are integral, and are typically cast from strong metal. The cleat forms two "U"-shaped channels between its base and its supported member at both of two opposite sides of the support member. Ropes may be pulled smoothly through these channels, pulled tight, and then wrapped in the form of various knots, or ties, around both the support member and the supported member to secure the taut rope to the cleat.

A cleat is sufficiently effective so as to have endured in common use for hundreds of years, and millions of replications. It should be understood, however, that a cleat is generally limited to use in the securing of ropes to a surface. Moreover, attachment of ropes to a cleat requires some modest skill, or intelligence, on the part of a user. The user must properly pull tight the rope(s), and tie the knot(s), in order to correctly, and adequately, both (i) tension, and (ii) secure, the rope(s) to the cleat.

Meanwhile, an equally common, and classic, fitting is the eye hook. The eye hook is intended, unlike the cleat, for use in free space. An eye hook is normally fabricated as a unitary device having (i) a cable, or rope, terminal eye for engaging one or more cables or ropes, integrally connected to (ii) an oppositely disposed hook for engaging another eye or other object that is either fixed to a floor, deck, or other support (which is not necessarily planar), or which is itself held in space by further cables or ropes.

Cleats and eye hooks have each been combined with other fittings, and with each other. U.S. Pat. No. 3,747,554 for a COMBINATION CHOCK AND FAIRLEAD FITTING shows a recessed chock (cleat) in combination with a fairlead passage, particularly for use on boats. U.S. Pat. No. 1,328,985 for a CLEAT shows a cleat that is secured to the edge of a planar surface by a screw clamp. U.S. Pat. No. 3,291,094 for a CLEAT DEVICE FOR WATER BORNE VESSEL and U.S. Pat. No. 3,905,322 for a BOAT MOORING CLEAT each show specialized cleats adapted for nautical use. U.S. Pat. No. 2,649,069 for a BITT-CHOCK shows a specially-configured double cleat for locking an intertwined rope. U.S. Pat. No. 3,948,203 for a MULTIPLE POINT SECURING CLEAT show a cleat that incorporates a terminal eye.

Particular previous combinations of an eye hook and a cleat, as is the subject of the present invention, are shown in U.S. Pat. No. 622,084 for a HAME FASTENER, and in U.S. Pat. No. 2,386,836 for a CARGO TIE-DOWN FITTING. In the hame fastener the "eye" of the eye hook is replaced by a dovetail socket that receives and holds a loop end of a tie rope. The hame fastener mounts a cleat to the body of the eye hook (actually a hook and a dovetail groove) at that side of the eye hook toward which its hook opens. Conversely, the tie-down fitting mounts a cleat upon a side of the eye hook opposite to that side toward which its hook opens. However, in both the hame fastener and the cargo tie-down fitting the cleat is located in a position intermediary between the eye hook's "eye" and its hook.

In operation of both the previous name fastener and the previous cargo tie-down fitting a rope is looped through one of two channels formed between the two guide-lugs of the cleat and the body of the eye hook to which the cleat is affixed. The rope is then pulled taught, passed through the remaining channel, and tied to or looped about the cleat in a substantially normal manner. According to this manner of intended use, at least the first one, and normally both, of the channels formed between the guide lugs of the cleat, and the body of the eye hook to which the cleat is affixed, are sufficiently "U"-shaped so as to be capable of slipping a rope that passes therethrough in order to tighten the rope. To repeat, the channels of the previous fittings combining an eye hook with a cleat must be "U"-shaped, in the manner of a conventional cleat, because rope must slide within such channels. Meanwhile that the cleat is independently used to secure the rope, in the substantial manner of all cleats, the eye hook essentially performs a related, but independent, fastening function.

The present invention will be seen to be based on a better, and more compatible, integration of the function, and structure, of both an eye hook and a cleat. Such an improved integration will promote, among other advantages, a simple and fast, virtually foolproof, secure fastening of ropes such as are commonly used to secure cargo or the like in diverse applications.

SUMMARY OF THE INVENTION

The present invention is based on the realization that, when a rope threads a fitting in order engage an external object to which the fitting is attached (or attachable), then (i) a pulling on the rope in order to tighten the rope is best done when the rope is slipped through, and pulled against, an eye that is present in the fitting, but then, the rope being pulled taught, it is best and most securely engaged by being (ii) wedged within a "V"-shaped channel of the fitting.

The concept of the attachment accorded by the fitting is thus to (i) pull first, and (ii) wedge second. The (i) pulling is through a feature—an eye—through which a rope may well, and easily, be pulled (but not wedged). The (ii) wedging is within a feature—a "V"-channel—within which a rope may well, and suitably, be wedged (but not slipped, or pulled).

In accordance with the present invention, each of an elongate fitting's (i) point (and axis) of attachment to the external object, (ii) defined eye, and (iii) defined "V"-shaped channel are located in a particular spatial relationship—basically along a straight line (an axis).

In one of its embodiments, the present invention is contained in a generally elongate fitting having, at a distal end, a hook for hooking an external object, an eye within a middle region, and, at a proximal end, a cleat for attaching a rope. The fitting includes, as a first part, an eye hook with an eye at its proximal end, a hook at its distal end, and a connecting shank between the hook and the eye. The fitting further includes, as a second part, a modified cleat that has both (i) a projecting arm and (ii) a pair of projecting arms. The pair of projecting arms form a channel, preferably of a "V" shape, between them.

In this first embodiment the modified cleat is affixed to the eye hook (i) in a position proximate to the eye hook's eye (ii) with the pair of projecting arms extending proximally from the region of the eye, meaning in a direction opposite to the direction of the distal end hook. Both the position and the direction of this affixation are very significant: the affixation (i) location and (ii) orientation jointly permit that a rope slipped through the eye may be pulled taught against the eye, and not against the channel of the cleat.

Further in this first embodiment the cleat's pair of projecting arms form a channel between them which channel narrows towards an apex. Because of this narrowing the channel is particularly suitable to compressively engage a rope as that is forcibly wedged within such channel.

In its more general form, a generally elongate fitting in accordance with the present invention includes (i) a distal-end region defining and presenting a structure suitable to affix an external object, integrally connected to (ii) a middle region, located proximally of the distal-end region, defining and presenting an eye, integrally connected to (iii) a proximal-end region defining and presenting a channel, which channel narrows towards an apex pointed towards the distal-end-region member's eye, and which channel is, because of such narrowing, suitable to compressively engage any rope as is forcibly wedged within such channel after being passed though the distal-end-region member's eye. The distal-end region affixes the external object while the middle region and the proximal-end region jointly attach a rope that is first passed through middle region's eye and then wedged within the proximal-end region's channel, therein securing the external object to the rope.

The distal-end region's structure suitable to affix an external object, the middle region's eye, and the proximal-end region's channel preferably all lie along substantially a straight line. Indeed, a balance point of the distal-end region structure's affixation of an external object, a center of the middle region's eye, and a central axis of the proximal-end region's channel preferably all lie substantially along the straight line.

The distal-end region's structure suitable to affix an external object may be, for example, either (i) a hook, or (ii) a swivel joint. The swivel joint may particularly be constructed from (i) an arm integrally connected to the fitting's middle region, (ii) a first member pivotally attached to the arm, and (iii) and a second member rotationally attached to the first member and fixedly attached to the external object. In this construction the arm, the first member and the second member present, in combination, a swivel joint a one end of which is fixedly attached to the external object and the other end of which is integrally connected to the fitting's middle region.

The middle region's eye is preferably a generally circular orifice at least twice the diameter of the width of the proximal-end region's channel. By this shape, and size, the orifice may readily pass and slip a rope that is wedged within the proximal-end region's channel.

The proximal-end region's channel may particularly consist of projecting arms that extend proximally from the middle region's eye, and that form between themselves a channel. This channel narrows towards an apex pointed towards the middle region's eye. It is, because of such narrowing, suitable to compressively engage any rope as is forcibly wedged within such channel after being passed though the middle region's eye.

In addition to the channel, howsoever constructed with projecting arms or not, the generally elongate fitting proximal-end region may further define a projecting arm extending distally from the middle region's eye. This arm, and a channel formed between it an the remaining body of the fitting, is useful to secondarily secure a rope that has already been wedged within the first, main, channel of the fitting's proximal end region.

The generally elongate fitting's proximal-end region preferably has and defines, at opposite sides of its defined channel, channel sides that are preferably possessed of an arcuate cross-section in the direction towards the interior of the channel. These arcuate cross-section channel sides are preferably so arcuate in substantially the shape of an arch, and particularly in the cross-sectional shape of a Gothic, or pointed, arch. By this construction a rope may be securely, but non-destructively, wedged and held.

By this construction of any of the various embodiments of fittings in accordance with the present invention, a rope may be passed through the eye of the fitting and then pulled tight. A desired tension in the rope having been achieved, the rope may easily be, while still held taut, angled into the "V"-shaped channel of the fitting. The taut rope will wedge within such "V"-shaped channel, and will immediately subsequently be held and secured.

The use of fittings in accordance with the present invention to this point is very fast, simple, and natural. There is no reasonable way to attempt to use the fitting save in the manner just described. Nonetheless to the ease, and rapidity, with which an initial connection is made, this initial connection is typically very strong, and on the order of hundreds of pounds yielding force.

Still further in accordance with the present invention the cleat's remaining projecting arm extends (i) from the region of the eye, and (ii) at an incline to the shank. A channel is thus formed between the arm of the modified cleat and the shank of the eye hook. This channel also narrows towards an apex, and is, because of such narrowing, also suitable to compressively engage a rope that is forcibly wedged within such channel.

It is because at least one, and preferably both, of the cleat's channels are "V"-shaped, as opposed to the more normal "U"-shape, that the cleat is spoken of as being "modified". Indeed, the sidewalls of the "V"-shaped channels of the fitting of the present invention may usefully be surfaced with serrations or other rough features which promote the frictional retention of ropes that are pulled snug within the channels. As previously mentioned, the cross-sectional contour of the channels, sidewalls is an arcuate segment, more particularly an arch and preferably a Gothic arch. These features are, of course, opposite to a standard cleat which promotes the smooth sliding of ropes or lines through its "U"-shaped channels with smooth, rounded, sidewalls.

In accordance with still another aspect of the present invention, an imaginary line bisecting the acute angle of the "V" which is formed between the cleat's pair of distally-extending arms will intersect the interior arcuate surface of the hook (or other mechanism for affixing an external object) at a location upon, and along, such surface where an external object is normally hooked during operational use of the fitting. This alignment best establishes that the line of force between a rope and an object to which the fitting is hooked bisects the proximal channel of the fitting. The rope itself (which is connected through the eye of the fitting) will pass directly over the top of this proximal channel as well as, having been looped and bent through 270°, passing perpendicularly through this channel. The rope which the fitting serves to connect thus lies against itself, and at an approximate 90° angle, where it passes through the proximal channel. The resultant frictional contact of the rope against itself operates like a knot even though, strictly speaking, no knot is topologically tied during a wrapping of the rope about the cleat.

According to the excellent frictional contact that a rope secured by the fitting of the present invention makes both (i) with the fitting, particularly at the locations of the fitting's two "V"-shaped channels, and (ii) with itself, the strength and reliability of the final connection so established is reliable and strong. Nonetheless that a connection of a rope by the fitting of the present invention is both strong and secure, it is also very easy and extremely quick. It is effectively impossible to perform an improper or unsatisfactory connection by use of the fitting because a cinching of the rope through but a single one of the cleats two channels typically provides an impressively strong retention force—often exceeding the strength of the rope itself. A normal correct and final connection, which can be realized in just a few seconds, is typically stronger than the tensile strength of the rope that is connected, and is typically in the order of many hundreds of pounds yield force.

These and other aspects and attributes of the present invention will become increasingly clear upon reference to the following drawings and accompanying specification.

BRIEF DESCRIPTION OF THE DRAWINGS

FIG. 4 is a table showing the results of testing the fitting in accordance with the present invention as constructed from different materials, and as secured in the manners shown in FIG. 1 and in FIG. 2.

DESCRIPTION OF THE PREFERRED EMBODIMENT

Figure 1:
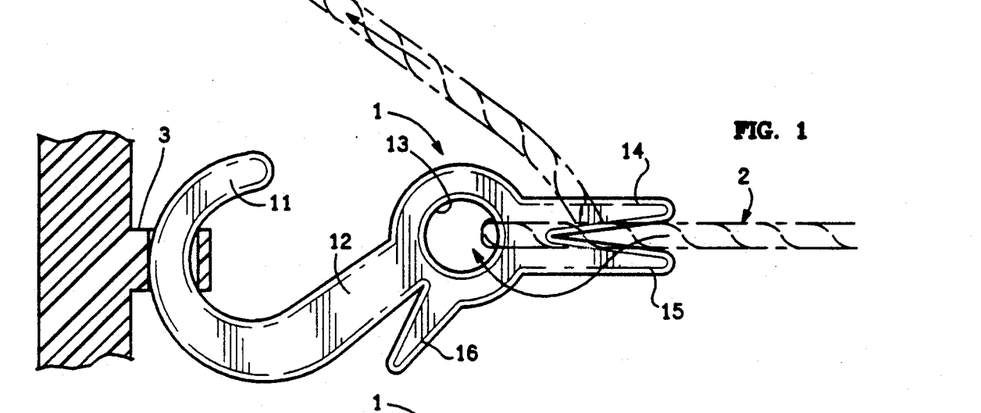
FIG. 1 is a diagrammatic view showing a first preferred embodiment of a fitting in accordance with the present invention, to scale, positioned and aligned for connecting a rope to an external object, and particularly showing how the rope may be (i) pulled tight, and then (ii) cinched.
Figure 2:
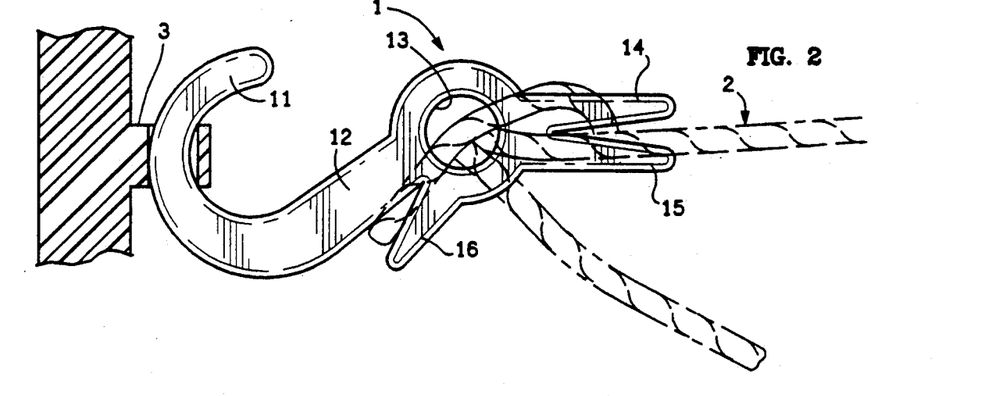
FIG. 2 is a diagrammatic view of a preferred connection made with the preferred embodiment of the fitting in accordance with the present invention.
Figure 3:
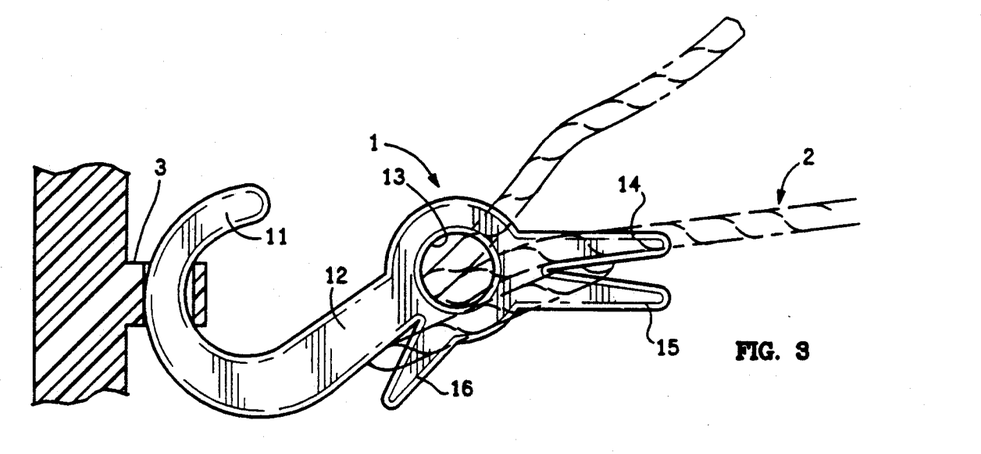
FIG. 3 is a diagrammatic view of an alternative connection made by use of the preferred embodiment of the fitting in accordance with the present invention.
Figure 5:
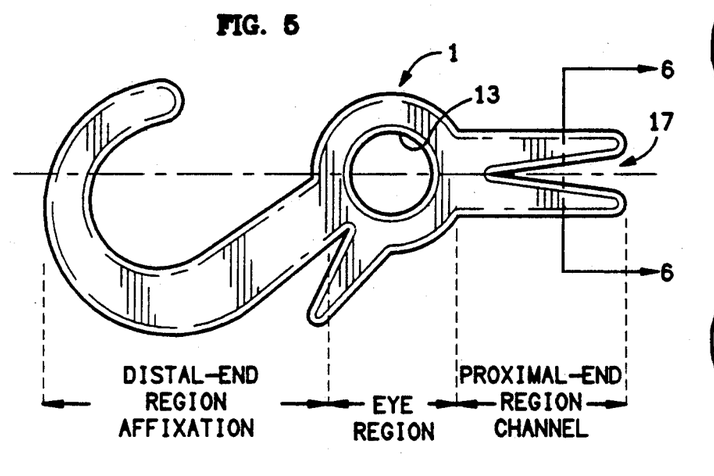
FIG. 5 is a diagrammatic view showing another, smaller, variant, to scale, of the first preferred embodiment of a fitting in accordance with the present invention previously seen in FIG. 1 with the operative regions, and the axis, of the fitting being shown.

A first preferred embodiment of a combination eye hook and modified cleat fitting 1 in accordance with the present invention is shown in diagrammatic view in FIGS. 1-3. The fitting 1 is approximately to scale. Another, smaller, variant of this same embodiment of the fitting 1 is shown in FIG. 5. As will be explained, the fitting one may be of many different sizes, and materials of construction, dependent upon application.

The fitting 1 connects at its distal end to a rope 2, or a cable or a chain or the like, and at its proximal end to a tie-down fitting 3, or a shackle or an eye terminal or a hook or the like. Both the rope 2 and the tie-down fitting, or shackle, 3 are shown in phantom line for not being a part of the present invention that is embodied in fitting 1. The rope 2 commonly extends over cargo or freight or other heavy items in order to lash such items to the bed or floor or deck of a vehicle, ship, aircraft, or other transport vehicle. The tie-down fitting 3 is nominally of a type common in the beds or floors or decks of vehicles, ships, and aircraft, and is strongly permanently attached to the frame of such vehicles, ships, or aircraft. The fitting 1 is not limited in use to transportation applications, but may readily be employed wherever hooks or cleats are commonly individually employed in order to secure ropes or lines to other objects, whether mobile or stationary.

The fitting 1 is commonly constructed of metal or else a strong composite material, typically either plastic or nylon. For long life, high strength, low cost, and resistance to corrosion in transportation applications, molded nylon that is variously 14% or 30% glass-filled is preferred for most normal light to heavy duty applications. The size of the fitting 1 is dependent upon the size of the rope 2 and the tie-down fitting 3 that it engages. A typical fitting 1 for use with ⅜ inch diameter synthetic or natural fiber rope is on the order of 5 inches by 2¼ inches in its maximum dimensions. The fitting 1 scales up or down from this size without appreciable detriment to its operative characteristics such as will be discussed. Accordingly, the principles of the present invention that are embodied in the fitting 1 will be understood to be substantially independent of any particular area of intended use of the fitting 1.

The fitting 1 has and presents a distal end hook 11 connecting through a shank 12 to an eye 13. The elements 11-13 constitute a standard eye hook.

Both a pair of extending arms 14,15 and a single extending arm 16 are integral with the eye hook in a position proximate its eye 13, and extend outward so as to form a cleat. More particularly, the pair of extending arms 14,15 extend proximally from the region of the eye 13, meaning in a direction opposite to the direction of the distal end hook 11. Meanwhile, the cleat's single projecting arm 16 extends at an incline to the shank 16, and typically from an side of such shank 16 that joins to the exterior bend radius of the hook 11, and that is thus opposite to that side of shank 12 that joins to the interior bend radius of the hook 11. Notably, the single projecting arm 11 need not be on that side of the shank 12 whereat it is illustrated in FIGS. 1-3 but could, instead, be at that side of the shank 12 that joins to the interior bend radius of the hook 11.

The important principles of the invention are not merely that a cleat or cleat-like structure should be used in proximity to, and together with, an eye hook, but exactly how these two structures are integrated, and modified, so as to best support the intended tie-down function of fitting 1.

In accordance with the principles of the invention, two channels are formed; one between the pair of projecting arms, and one between the arm of the modified cleat and the shank of the eye hook. Each channel also narrows towards an apex, and is, because of such narrowing, also suitable to compressively engage a rope that is forcibly wedged within such channel.

In particular, the cleat's pair of projecting arms 14,15 form a channel between them which channel narrows towards an apex. Because of this narrowing the channel is particularly suitable to compressively engage the rope 2 when it is forcibly wedged within such channel.

Another channel is also formed between the arm 16 of the modified cleat and the shank 12 of the eye hook. Preferably this channel also narrows towards an apex, and is, because of such narrowing, also suitable to compressively engage the rope 2 when such rope 2 is forcibly wedged within such channel. Both channels may be properly described as "V"-shaped, as opposed to the more common "U"-shaped channels of a common cleat.

It is because at least one, and preferably both, of the channels of the fitting 1 are "V"-shaped, as opposed to the more normal "U"-shape, that the cleat portion of the fitting 1 is spoken of as being "modified". Indeed, the "V"-shaped channels may be surfaced with serrations or other rough features (not shown) which promote the frictional retention of a rope 1 when such rope 1 is pulled snug within the channels.

The position and the direction of the affixation of the pair of projecting arms 1 to the eye hook portion of the fitting 1 operate synergistically with the modified, "V"-shaped, nature of the channels. The (i) location and (ii) orientation of the pair of arms 14,15, in combination with the "V"-shaped channel created between such arms 14,15, jointly permit that a rope 2 slipped through the eye 13 may be pulled taught against the eye 13, and not against the channel of the cleat, until, a desired tension in the rope 2 having been achieved, the rope 2 may quite easily and quickly be, while still held taut, angled into the "V" channel of the cleat which is formed between the two projecting arms 14,15. The rope 2 is subsequently held and secured within such "V" channel to a remarkable degree.

This intermediary step in connecting the rope 2 to the fitting 1 in accordance with the present invention is shown in FIG. 1 precisely so that it may be emphasized that a connection of considerable strength has already been made, and tightly made. Especially when the flexibility and compressibility and frictional resistance of the rope 2 are suitable to the "V" channel between the arms 14,15 within which channel the rope 2 is clenched, even the rudimentary, and de minimis, connection shown in FIG. 1 may prove stronger than the rope 2 itself.

Moreover, it will be noted that an imaginary line bisecting the acute angle of the "V" which is formed between the cleat's pair of distally-extending arms 14,15 will intersect the interior arcuate surface of the hook 11 at a location upon, and along, such surface where the external tie-down fitting 3 is normally hooked during operational use of the fitting. This alignment establishes that the line of force between a rope and an object to which the fitting is hooked bisects the proximal channel of the fitting 1 between its arms 14,15. The rope 2 itself (that is connected through the eye 13 of the fitting 1) will pass directly over the top of this proximal channel as well as, having been looped and bent through 270°, passing perpendicularly through this channel. The rope 2 which the fitting serves to connect thus lies against itself, and at an approximate 90° angle, where it passes through the proximal channel. The resultant frictional contact of the rope against itself operates like a knot even though, strictly speaking, no knot is topologically tied during a wrapping of the rope about the fitting 1 (as is more completely illustrated in FIGS. 2 and 3).

The result of these carefully chosen geometries is profound: a rope that is tightened and cinched to the fitting 1 in mere seconds so as to assume the position of FIG. 1 will, nonetheless to the rapidity and ease with which it is secured, be quite reliably and strongly held. Indeed, the rudimentary connection shown in FIG. 1 is, without more, often stronger than the tensile strength of the rope 2 itself. This means that, if pulled to breakage, the rope 2 will break at a location other than its attachment to the fitting 1, and will not pull from the fitting 1.

A preferred completion of the attachment of the rope 2 to the fitting 1, and through such fitting 1 to the tie-down point 3, is diagrammatically illustrated in FIG. 2. A first alternative connection is diagrammatically illustrated in FIG. 3. As another, second, alternative (not shown) to that alternative shown in FIG. 3, the stub end of the rope 2 can be passed between the fitting 1 and that portion of the rope 2 that proceeds between the two channels. Both this second alternative connection (not shown), and the actual alternative connection shown in FIG. 3, are not as preferred as is the connection shown in FIG. 2. This is because the relative orientation of fitting 1, rope 2, and tie-down fitting 3 within the preferred connection shown in FIG. 2 produces an alignment of the rope 2 that is similar to a two half hitches knot. The connection is not, of course, a tightened knot. Nonetheless, it is obvious that even the slipperiest of ropes would not easily escape the retention of the preferred completed connection shown in FIG. 2.

Notably, the connection that is preferred—shown in FIG. 2—is the connection that is promoted by the relative positions, and alignments, of the arms 14-16 relative to the eye 13, the shank 12, and the hook 11. Mainly, the axis of the pulling force is completely determined by the time that connection has preceded so far as is shown in FIG. 1.

According to the excellent frictional contact that a rope 2 secured by the fitting 1 of the present invention makes both (i) with the fitting, particularly at the locations of the fitting's two "V"-shaped channels, and (ii) with itself, the strength and reliability of the connection so established is excellent. Nonetheless that a connection of a rope 2 by the fitting 1 of the present invention is both strong and secure, it is also very easy and extremely quick. It is effectively impossible to perform an improper or unsatisfactory connection by use of the fitting 1 because a cinching of the rope through but a single one of the two "V"-shaped channels of the fitting 1 typically provides an impressively strong retention force which often exceeds the strength of the rope 2 itself. A normal correct connection, which can be realized in just a few seconds, is typically stronger than the tensile strength of the rope 2 that is connected.

A computer simulation of stresses within the fitting under simulated loads has been performed. The regions of the tip ends of all projecting arms 14-16, and of the tip end of hook 11, are subjected to low stress, and need not be overly thick or strong. As may well be imagined, most of the stress within the fitting is concentrated in its shank 12, around the periphery of its eye 13, and between its pair of projecting arms 14,15 at their "V"-shaped union. The fitting 1 need not be of equal thickness in all regions, and may typically be made thicker and more robust in regions of highest stress forces.

Actual destructive testing of fittings in accordance with the present invention as were fabricated from different materials were conducted. The testing generally validated the computer modeling. The fittings were tied with strong rope, and loaded (pulled) in a hydraulic test fixture until failure. Failure could result either when the fitting broke or was deformed so far that if slipped off the anchor bolt (no loosing of the connected rope was experienced). The load was typically applied over a few seconds. Accordingly creep was not part of the test. The ambient temperature was maintained at 60° F.

The fittings were fastened for test in two different ways. The first way was "cinched", meaning completely tied and fastened in the preferred manner shown in FIG. 2. The second way was "looped", meaning the initial connection only such as was shown in FIG. 1. The purpose of testing the "looped" configuration was to determine the strength of the wedging effect of the rope 2 between the pair of projecting arms 14,15.

The results of the testing for selected materials are tabulated in the Table of FIG. 4. Results show that a sharp apex, or crack, between the pair of projecting arms 14,15 should be avoided because of a premature failure induced by the wedging action of the rope, at least during the "cinching" attachment and/or during construction of the fitting from more brittle materials.

When the preferred, "looped", method of retaining the fitting 1 was used failure usually occurred at the shank 12 of the hook—exactly as predicted by computer simulation. Accordingly, with due care to the radius of the apex of the fork saddle, or channel, between the pair of projecting arms 14,15 and the possible use of stress risers in this location, the fitting can be made from materials, including steel, so as to exhibit any reasonably desired strength. In accordance with the showing of FIG. 4, synthetic materials such a nylon well suffice to produce fittings with yield strengths in excess of several hundred pounds.

It is because at least one, and preferably both, of the cleat's channels are "V"-shaped, as opposed to the more normal "U"-shape, that the cleat is sometimes spoken of as being "modified". Indeed, the "V"-shaped channels of the fitting of the present invention may usefully be surfaced with serrations or other rough features which promote the frictional retention of ropes that are pulled snug within the channels. This is, of course, opposite to a standard cleat which promotes the smooth sliding of ropes or lines through its "U"-shaped channels.

Figure 6:
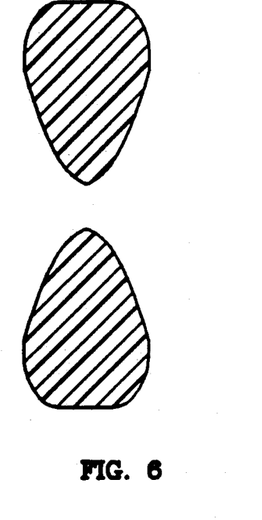
FIG. 6 is a cross-sectional view at an enlarged scale, taken along aspect line 6—6 shown in FIG. 5, of a preferred cross-sectional, arched, contour to the proximal-end region channel of the fittings shown in FIGS. 1-3, 4 and 6.

Still further principles of the invention may be observed in FIGS. 5 and 6. The fitting 1 need not be considered only as an eye hook in combination with a cleat but, more generally, as a combination of interconnected, typically integral, elements each of which is positioned in a fixed relationship to the other elements, and each of which serves a particular purpose. The various elements cooperate synergistically to produce a quick connect, quick release, fitting for quickly and securely connecting a rope, cable, cord or the like.

So considering the fitting, and by reference to FIG. 5, a first, distal-end region of the fitting is dedicated to affixing an external object. This region of the fitting need not be a hook but could, for example, be a bolt, a screw, a bulbous knob for engaging a complimentary slot, or any of multitudinous mechanisms for affixing to an external object. For example, a swivel mechanism 41, 42 mounting to an external object (not shown) will be shown as part of fitting 4 in FIG. 7. Proximally of the DISTAL-END REGION AFFIXATION is an EYE REGION, or a region of the fitting 1 defining an aperture (or, less desirably, a slot). This middle region further connects, preferably integrally, to a proximal-end region defining a (preferably "V"-shaped) channel. The EYE REGION's aperture is typically larger than the rope (shown in FIGS. 1-3) that it passes or slips, and is more typically a circle with a diameter two times the diameter of the rope that passes through it in order that the rope may slip easily. The PROXIMAL-END REGION CHANNEL is, conversely, wider than the diameter of the received rope (reference FIGS. 1-3) at its widest, proximal-end, opening but the progressively narrows, normally linearly progressively as the sides of a "V", toward its narrower, distal, end. The distal end of the channel 17 is normally configured as the apex of the "V".

In the present invention, an imaginary line, or axis 18, bisecting the acute angle of the "V" which is formed between the cleat's pair of distally-extending arms will preferably approximately intersect both (i) the center of the aperture, or eye, 13 and (ii) the interior arcuate surface of the hook (or other affixation mechanism) at a location upon, and along, such surface where an external object is normally hooked (or otherwise affixed) during operational use of the fitting. This alignment best establishes that the line of force between a rope and an object to which the fitting is hooked (or affixed) bisects the proximal-end region channel 17 of the fitting. The rope itself (which is connected through the eye of the fitting) will pass directly over the top of this proximal-end region channel 17 as well as, having been looped and bent through 270°, passing perpendicularly through this channel 17. The rope which the fitting serves to connect thus lies against itself, and at an approximate 90° angle, where it passes through the proximal-end region channel 17. The resultant frictional contact of the rope against itself operates like a knot even though, strictly speaking, no knot is topologically tied during a wrapping of the rope about the cleat.

Still further in accordance with the present invention, each of the interior, oppositely-disposed, surfaces on each of the opposite sides to the channel 17 has the shape of an opening defined by an arcuate line segment, and particularly by an arch, and most particularly by a Gothic arch. The preferred cross-sectional contours of these opposed surfaces is shown at expanded scale in FIG. 6, which is a view taken along aspect line 6—6 shown in FIG. 5. The preferred, Gothic arch, contours of the sidewalls to channel 17 have two advantages. First, the rope cinched, or wedged, within the channel is tightly and compressively held without slipping while it is not so easily cut as a channel side "edge"of a "sharper" contour would likely cause. Second, the sidewall has a reasonable amount of mass, or material, close to the location of the wedged rope. This material gives the channel sidewall strength, and prevents that it should be "stripped" when a rope, especially a wire rope, is attempted to be forcibly pulled from its wedged position within the channel.

Serrations upon the opposed inner surfaces of the sidewalls of the channel 17 are normally neither required nor desired, but if included they may be along several axis that are longitudinal to the channel 17, and substantially parallel to the AXIS 18. This is opposite to the a more typical orientation of the serrations substantially perpendicular to AXIS 17, which orientation is common when the purpose of the serrations is to prevent the rope from slipping out as opposed to pulling through.

Figure 7:
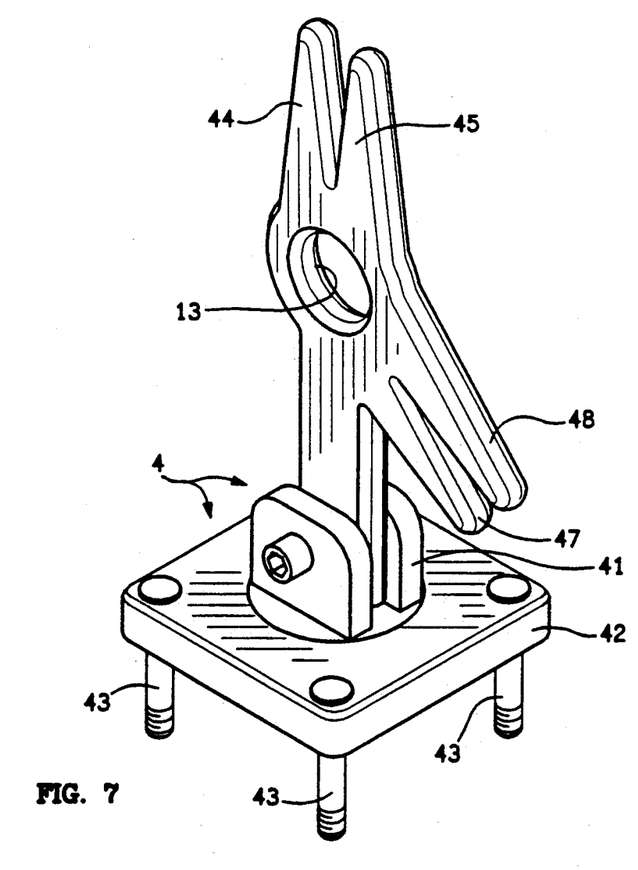
FIG. 7 is a diagrammatic view showing a second preferred, swivel, embodiment of a fitting in accordance with the present invention approximately to scale, the swivel fitting positioned and aligned for connecting at its proximal end a rope by cinching, and for connecting at its distal end an external object by bolting.

A diagrammatic view of a second preferred, swivel, embodiment of a fitting 4 in accordance with the present invention is shown, approximately to scale, in FIG. 7. A swivel fitting positioned and aligned for connecting at its proximal end a rope by cinching, and for connecting at its distal end an external object by bolting.

The proximal-end region presents a pair of projecting arms 44, 45 which define between them a channel—similarly to projecting arms 14, 15 shown in FIGS. 1-3. The eye 13 is between this PROXIMAL-END REGION CHANNEL and the DISTAL-END REGION AFFIXATION. In the embodiment of FIG. 7, this DISTAL-END REGION AFFIXATION consists of a rotating member 41 that pivotally connects by a bolt 46 to a continuation in the distal direction of the same member that defines the eye 13. The rotating member 41 has a circular base that is complimentary to a recess in the underside of the base member 42. The circular member 41 may rotate within the base member 42 while, because of the mass of material used in the construction, it cannot readily be pulled in a proximal direction through, and from, the base member 42. The base member 42 is itself mounted to an external object (not shown) by bolts 43.

The mounted base member 42 and the rotating member 42 form, in combination, a swivel joint. The joint responds both to rotate, and to assume an angle, in response to pulling forces generated by a rope (not shown) that is passed through the eye 13 and wedged within the channel formed between arms 44,45. The securing of the rope is in the manner of FIGS. 1-3. Again similarly to FIGS. 1-3, the rope may be further, secondarily, wedged within the second, secondary, channel formed (in this second embodiment) between the projecting arms 47,48.

Two embodiments having been observed and considered, it will now be clear to a practitioner of the arts of stress analysis that the fitting of the present invention is not a mere jumble of mechanical elements, but is a careful combination of carefully formed, and positioned, elements directed to operating synergistically in first tightening, and in then securing, a rope (or the like). For example, the channel or channels of fittings in accordance with the present invention need not be defined between, nor associated with, "arms". It is the location of the channel or channels relative to the physical axis, and to the stress axis, of the fitting, that is important, and not the manner of the external structure that defines such channel or channels. An interesting exercise in applying the principles of the present invention is to consider the construction of a fitting that, unlike the substantially planar fittings 1 and 4, is constructed in three dimensions with a different spatial orientation to the direction (axis) in which the rope passes the eye, or aperture, and either, or both, of the channels. For example, the fittings 1, 4 may be imagined to be twisted along their longitudinal axis so as to form a spiral. When so imagined, it becomes increasingly clear that the high performance of fittings in accordance with the present invention is due to the relationship, and synergistic operation, of the parts of the fittings.

According to the excellent frictional contact that a rope secured by the fitting of the present invention makes both (i) with the fitting, particularly at the locations of the fitting's two "V"-shaped channels, and (ii) with itself, the strength and reliability of the final connection so established is reliable and strong. Nonetheless that a connection of a rope by the fitting of the present invention is both strong and secure, it is also very easy and extremely quick. It is effectively impossible to perform an improper or unsatisfactory connection by use of the fitting because a cinching of the rope through but a single one of the cleats two channels typically provides an impressively strong retention force—often exceeding the strength of the rope itself. A normal correct and final connection, which can be realized in just a few seconds, is typically stronger than the tensile strength of the rope that is connected, and is typically in the order of many hundreds of pounds yield force.

In accordance with the preceding explanation, various alternative embodiments of the present invention will suggest themselves to a practitioner of the mechanical design arts. For example, the hook could be replace with a threaded rod, in the manner of an eye bolt, or with another, second, eye, in the manner of a double-eyed turnbuckle. For example, either or both of the pair of arms 14,15 could be more harmoniously visually integrated into the shape of the eye hook, appearing as sort of a "pointy" proximal end region thereof. For example, the arm 16 could be moved in position—including to point alongside, or in a plane slightly skewed relative to the plane of, the pair of arms 14,15. Indeed, the arm 16 could be replace by an aperture, clamp, or any other common mechanical structure which performs its secondary holding and retention function.

According to these and other possible alterations and adaptations of the present invention, the invention should be broadly interpreted in accordance with the following claims, only, and not solely in accordance with that preferred embodiment within which the invention has been taught.

What is claimed is:

1. A generally elongated fitting having a first end adapted to be fastened to a structure and a second, opposite, end adapted to be releasably secured to a rope, the fitting comprising:
   a central eye portion having an open eye extending therethrough;
   a bar-shaped continuation of said central eye portion extending away from said central eye portion in a first direction;
   support means connected to said bar-shaped continuation for securing said fitting to a structure;
   said support means including spaced brackets adapted to receive said bar-shaped continuation therebetween and means to secure said bar-shaped continuation to said brackets in a manner permitting movement of said fitting relative to said structure;
   first and second closely spaced arms secured to said central eye portion and extending away from said central eye portion in a second direction generally opposite to said first direction;
   the adjacent sides of said first and second arms forming a generally V-shaped channel having an apex extending toward said open eye; and
   third and fourth closely spaced arms secured to said central eye portion and extending away from said central eye portion in a third direction at an acute angle to said bar-like continuation;
   the adjacent sides of said third and forth arms forming a generally V-shaped channel having an apex extending toward said central eye portion;
   whereby said V-shaped channels are adapted to securely but releasably grasp a rope forcibly wedged thereinto.

2. The fitting according to claim 1 wherein said support means for securing to said fitting to a structure includes a base fastenable to a structure, a pair of upstanding spaced brackets adapted to receive the free end of said bar-like continuation therebetween, an aligned transverse hole through said brackets and continuation and rigid means extending through said hole whereby said continuation is secured to said base while permitting said continuation to pivot about said rigid means.

3. The fitting according to claim 2 further including swivel means mounted on said base and supporting said brackets, permitting said fitting, brackets and swivel means to rotate.

4. The fitting according to claim 3 wherein said rigid means is a bolt and said base is secured to a structure by a plurality of threaded members.

5. The fitting according to claim 1 wherein the opposed sides of said arms lie along substantially straight lines.

6. The fitting according to claim 1 wherein each of said arms, in cross-section, narrows to a point extending toward the opposed arm.

7. The fitting according to claim 1 wherein said fitting is formed from glass fiber filled nylon.

8. A generally elongated fitting having a first end adapted to be fastened to a structure and a second, opposite, end adapted to be releasably secured to a rope, the fitting comprising:
   a central eye portion having an open eye extending therethrough;
   a bar-shaped continuation of said central eye portion extending away from said central eye portion in a first direction;
   support means adapted to connect the free end of said continuation to a structure;
   said support means including spaced brackets adapted to receive said free end therebetween and means to secure said free end to said brackets in a manner permitting movement of said fitting relative to said structure;
   first and second closely spaced arms secured to said central eye portion and extending away from said central eye portion in a second direction generally opposite to said first direction;
   the adjacent sides of said first and second arms forming a generally V-shaped channel having an apex extending toward said open eye; and
   third and fourth closely spaced arms secured to said central eye portion and extending away from said central eye portion in a third direction at an acute angle to said bar-like continuation;
   the adjacent sides of said third and forth arms forming a generally V-shaped channel having an apex extending toward said central eye portion;
   whereby said V-shaped channels are adapted to securely but releasably grasp a rope forcibly wedged thereinto.

9. The fitting according to claim 8 further including swivel means mounted on said support means and supporting said brackets, permitting said fitting, brackets and swivel means to rotate.

10. The fitting according to claim 9 wherein said base is adapted to be secured to a structure by a plurality of screws or bolts.

11. The fitting according to claim 8 wherein the opposed sides of said arms lie along substantially straight lines.

12. The fitting according to claim 8 wherein each of said arms, in cross-section, narrows to an approximate point extending toward the opposed arm.

13. The fitting according to claim 8 wherein said fitting is formed from glass fiber filled nylon.

* * * * *